Patented Apr. 26, 1938

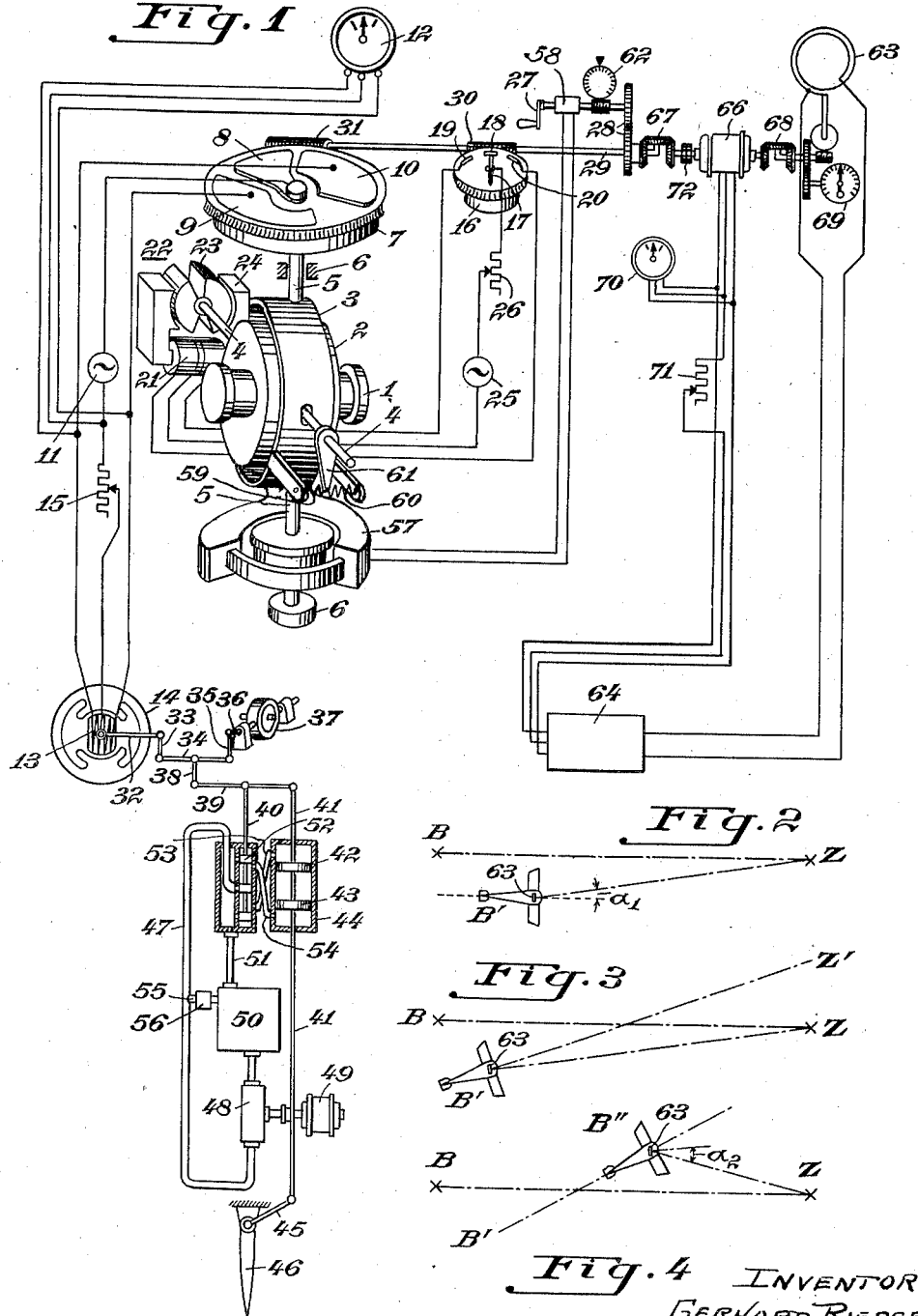

2,115,498

UNITED STATES PATENT OFFICE 2,115,498

DIRECTION MAINTAINING DEVICE FOR DIRIGIBLE CRAFT

Gerhard Rieper, Berlin-Mariendorf, Germany, assignor to Siemens & Halske, Aktiengesellschaft, Siemensstadt, near Berlin, Germany, a corporation of Germany Application August 15, 1934, Serial No. 740,007
In Germany August 16, 1933

10 Claims. (Cl. 244—77)

This invention relates to improvements in a direction maintaining or course governing device for dirigible craft, especially aircraft, which device comprises as course governing instrument an absolute direction indicator. The term "absolute direction indicator" means here and in the claims an instrument, whose direction indication or direction finding effect is not controlled by a radio transmitting station or any other equipment of the station which is to be reached by the craft, but is based upon general physical properties and therefore, as for example a magnet compass, an earth inductor compass, a gyroscopic apparatus, may well be termed as an absolute one.

Primarily one of the objects of this invention is to combine the said course governing device having an absolute direction indicator with means, which will automatically compensate the effect of drifting, caused by winds having a component parallel to the transverse axis of the craft; id est the compensating effect will be such that the craft will take the shortest path to the station to be reached. For this purpose an operative connection between the absolute direction indicator and an instrument measuring directly or indirectly the drift of the craft is provided, which connection causes the position of the absolute direction indicator to be automatically influenced by said instrument measuring the drift in such a way, that the absolute direction indicator will be given a deflection or deviation compensating such drift.

For the measuring of the drift any well known instruments may be used, but a very simple arrangement is obtained by using a radio sending and receiving system, which arrangement naturally requires a radio sending apparatus at the station to be reached by the craft.

One mode of carrying the invention into effect is illustrated by way of example in the accompanying drawing, in which Fig. 1 shows one embodiment of the invention,
Figs. 2 to 4 show diagrams serving for better understanding of the operation of the embodiment shown in Fig. 1.

For the purpose of showing that the absolute direction indicator may consist of a combination of a plurality of instruments, in the embodiment illustrated in Fig. 1 a direction indicator composed of a gyroscopic and of a magnetic compass is used. But this combined direction indicator per se is not an object of this invention. The said arrangement may now be described in the following referring to Fig. 1.

The spinning axis 1 of the gyroscope is horizontal and the casing 2 of the gyroscope is mounted for oscillation in a vertical ring 3 on the horizontal axis 4, the so called interior Cardan axis at right angle to the spinning axis 1. With the vertical ring 3 in turn is connected a vertical axis 5, the so called exterior Cardan axis, by means of which the vertical ring 3 is mounted for oscillation in stationary bearings 6 about the vertical axis. The mass of the gyroscope rotor, the spinning axis of which is 1, is so arranged, that its center of gravity coincides with the geometrical point of intersection of the two Cardan axes 4 and 5.

The exterior Cardan axis 5 projects with its one end into a casing 7 filled with an electrolytic fluid and carries on the said end an electrode 8 which is movable within the said casing 7 between two electrodes 9 and 10 fixed to the said casing 7. The said three electrodes 8, 9 and 10 are arranged in an electrical circuit which includes in the manner shown connecting leads, an alternating current source 11 and electrically parallel to each other a differential measuring instrument 12 on the one hand and a winding carried by the armature 13 of an electromagnet 14 with a regulating resistor 15 on the other hand. It will be obvious that the measuring instrument indicates in a well known manner the deviations of the electrode 8 from its middle position shown in Fig. 1.

16 designates a liquid magnetic compass comprising a casing filled with an electrolytic fluid, a magnetic needle 17, an electrode 18 carried by the said needle 17 and movable within the compass casing between two electrodes 19 and 20 fixed to the casing of the compass 16. The said electrodes 18, 19 and 20 of the compass 16 are arranged in an electrical circuit which includes besides connecting leads, the winding 21 of an electromagnet device 22, the armature 23 of which is connected to the horizontal Cardan axis 4 of the gyroscope casing 2, while the stator 24 of said device 22 is fixed to the vertical ring 3, the circuit also including an alternating current source 25 and a regulating resistor 26.

The desired adjustment of the aircraft or other craft is determined by rotating the casing of the compass 16 with respect to the parts 17 and 18 and by rotating the casing 7 relatively to the system carried by the axis 5 by means of a handle 27 coupled by means of a spur gear system 28 with a spindle 29 and operating this spindle and the worm-gears 30 and 31 driven therefrom and the wheels of which are carried by the casing of the compass 16 and by the casing 7 respectively. The armature 13 of the electromagnet 14 is mechanically coupled by means of a lever 32 and a rod 33 to the one end of a double-armed lever 34, the other end of which is pivotally connected by means of a rod 35 and a lever 36 to a so-called turn indicator 37. The last mentioned instrument responds to the angular velocity with which the craft deviates from the predetermined course; it is well known to use such an instrument in connection with automatic steering devices for craft for the purpose of preventing oscillations of the craft about a set course. The said lever will accordingly move in response to the deviation of the craft from the set course and to the angular velocity with which the said deviation takes place.

Motion of the lever 34 is transmitted by means of a connecting rod 38 to a lever 39 linked at its one end to the said rod 38 and at its centre to a valve stem 40 whilst at its other end the lever 39 is pivotally connected to a piston rod 41. Two pistons 42 and 43 working in a cylinder 44 are carried by the rod 41 which is coupled at its end remote from the lever 39 to the organ to be controlled by means of a lever 45, in this case to the lateral rudder 46 of an aircraft or any other craft. The pistons 42 and 43 and the cylinder 44 together constitute an hydraulic servomotor for adjusting the rudder 46.

By means of a conduit 47 the cylinder 44 of the hydraulic servomotor is connected to a source of operating fluid, illustrated as a pump 48 driven by a motor, for example by an electromotor 49, and which supplies the fluid medium from a reservoir 50 into the said conduit 47. The discharged fluid from the hydraulic motor 42, 43, 44 passes through a conduit 51 back to the said reservoir 50. Passage of operating fluid to the hydraulic motor is controlled by a piston valve 52 comprising three members or pistons secured to the valve stem 40 and operating in a valve chamber 53 with which the conduits 47 and 51 communicate as shown. The conduit 51 is in communication with the two end ports or exhaust ports of the valve chamber 53, while the conduit 47 communicates with the chamber 53 through a port located at about the middle thereof. The three members of the piston valve 52 are so arranged that in the position shown they will maintain the three ports closed. On the opposite sides of the central member of the piston valve two ports are provided in the chamber 53 which are connected by passages 53 and 54 with the spaces at the opposite ends of the cylinder 44. 55 designates a conduit or by-pass communicating with the conduit 47 and the reservoir 50, and 56 is a valve in this by-pass, which valve in a well known manner will open the by-pass, if no operating fluid is needed for the control mechanism.

57 is an electromagnetic lock, the armature of which is carried by the exterior Cardan axis 5 of the gyroscope and the stator of which is stationary and carries a winding controlled from the output of a source of current switched in or driven upon rotational movement of the above mentioned handle 27. Therefore the gyroscope will be automatically locked when the course is changed. In the embodiment shown in Fig. 1 the said source of current is in the form of an alternator 58 driven on upon rotational movement of the said handle 27. The alternator 58 may be coupled with the handle by means of a gear such as a worm gear. The predetermined course is indicated by an indicator 62, which is also coupled to and driven by the handle 27 by means of a worm gear. 59 and 60 are two springs of small moment each of which is fixed at its one end to the ring 3 and at its other end to a lever 61 carried by the interior Cardan axis 4. By the action of the said springs 59 and 60 the axis 4 when deflected will always return into its zero position.

The operation of the elements above described is as follows: Upon deviation of the craft from its course, predetermined by the adjustment of the casing of the magnet compass and of the casing 7 of the gyroscope, the piston valve 52 moves in response to the combined action of the gyroscope or of the magnet 14, influenced by the gyroscope and the turn indicator 37. In consequence thereof the pistons 42, 43 of the servomotor will move in a well known manner and adjust the rudder 46. In the said manner the craft is maintained on a predetermined course by means of the gyroscope. But, as is well known, a free gyroscope in time tends to deviate from its original position. For this reason the magnetic compass 16 is provided which will in the manner shown apply a corrective moment about the horizontal axis 4 of the gyroscope by means of the magnet 22. The said moment in turn causes precession of the gyroscope about its vertical axis 5, whereby the gyroscope returns to its original position.

To compensate the effect of drift of the craft the following means are combined with the above described and per se well known course governing instrument. 63 is a receiving antenna, or rather loop, as generally used for determining the direction of a radio sending arrangement provided at the station which is to be reached by the craft. The receiving loop antenna 63 is electrically connected to a receiving and an amplifier circuit well known in the art and therefore indicated only generally at 64. The output side of the last mentioned circuit 64 is connected to an electromotor 66. The axis of the electromotor 66 is mechanically coupled at its one end by means of a differential gear 67 to the spindle 29 and at its other end by means of a differential gear 68 to the carrier of the receiving loop 63, which carrier is mounted for turning about a vertical axis. In consequence of the provision of the differential gear 68 it is possible to adjust the loop 63 about a vertical axis by means of the motor 66 as well as by hand by means of an indicator 69 coupled to the one side wheel of the differential gear 68. 70 is a measuring instrument connected also to the output of the receiving circuit 64, and 71 is a regulating resistor.

The arrangement shown operates as follows: At the beginning the loop antenna 63 is adjusted according to the desired course in like manner as the magnetic compass 16 and the casing 7 of the gyroscope and therefore at beginning the loop will be set at an angle of 90° with respect to the radio beam of the station which is to be reached by the craft. Assuming now that at any time the craft drifts on account of a lateral wind, then the craft will laterally be drifted out of the original course line as, for example, it is shown in Fig. 2. In this figure and also in Figures 3 and 4, B designates the station from which the craft is coming and Z the station toward which the craft is flying. In consequence of the drift, in position shown in Fig. 2 the radio beam will enclose with the loop antenna an angle $\alpha_1$. In consequence of this the output of the receiving circuit 64 supplies the motor 66 with current of a certain direction in a manner known per se, which motor thereupon begins to run. Thereby on the one hand the course predetermined by the adjustment of compass 16 and of the casing 7 will be changed and on the other hand the loop antenna 63 will be rotated about its vertical axis. In consequence of this the craft will take the new course B'—Z', as shown in Fig. 3. This course line B'—Z' does not point directly toward the station which is to be reached, but it may be noted that in consequence of the drifting the station Z may be reached by maintaining the course B'—Z'.

In the position shown in Fig. 3, the loop antenna 63 again forms an angle of 90° with the radio beam radiated from the station Z. In consequence of this the motor 66 will cease to run. If the described change of the course is now right with respect to the drifting of the craft, the latter will attain the station Z on the line B—Z, that is on the shortest way. In the other case after some time the craft will attain for example a point B'', as is illustrated in Fig. 4. In this position the loop antenna 63 is again deflected from its zero position with respect to the radio beam. The angle of deflection may be, for example, α₂. But it may be noted that the sense of deflection of the loop antenna 63 in this case is opposite to the sense of deflection in the case illustrated in Fig. 2. Therefore the motor 66 begins to run and adjust the loop antenna 63 and the other above mentioned elements in a direction opposite to the direction of rotation in the case shown in Fig. 2. From the above description will be seen that after some time the craft has automatically taken a course which compensates the drifting of the craft in such a manner that it will attain the station Z along the shortest path.

It is clear that the radio receiving apparatus used for the above mentioned purposes may be varied in any manner known in the art. For example two loop antennae enclosing an angle of 90° with another or a normal and a loop antenna may be used in combination with any adapted receiving apparatus, comprising amplifier and rectifier. In each case the radio receiving arrangement must be such a one that the polarity or characteristic of the output will depend on the direction in which the receiving antenna is deflected from its normal position with respect to the radio beam.

While I have described my invention as embodied in one form, it should be understood that I do not limit my invention thereto, since various modifications thereof will suggest themselves to those skilled in the art without departing from the spirit of my invention, the scope of which is set forth in the annexed claims.

I claim as my invention:

1. In a system for the automatic steering of dirigible craft, the combination of an absolute direction indicator including a member connected with the craft and a movable member, a steering device, an operative connection between said movable member and said steering device, an instrument measuring the drift of the craft and means whereby the said instrument will automatically shift relatively to the craft, that member of said direction indicator which is connected with the craft, in such a manner as to compensate for the drift.

2. In a system for the automatic steering of dirigible craft, the combination of an absolute direction indicator including a member connected with the craft and a movable member, a steering device, an operative connection between said movable member and said steering device, a radio direction finder, and means for automatically pointing said direction finder toward the destination of the craft and simultaneously automatically shifting that member of said direction indicator which is connected with the craft, relatively to said craft in such a manner that the craft will travel to its destination along a substantially straight path.

3. In a system for the automatic steering of dirigible craft, the combination of an absolute direction indicator including a member connected with the craft and a movable member, a steering device, an operative connection between said movable member and said steering device, an instrument measuring the drift of the craft, means whereby said instrument will automatically shift relatively to the craft, that member of said direction indicator which is connected with the craft, and means for manually shifting said member relatively to the craft independently of the automatic steering.

4. In a system for the automatic steering of aircraft, an absolute direction indicator, electrolytic means for deriving a steering component from the movement of said indicator, a turn indicator, means for deriving another steering component from the movement of said turn indicator, a steering motor, means for causing said motor to be acted upon by both of said components, an instrument measuring the drift of the aircraft, and means for shifting automatically the casing of said direction indicator relatively to the said craft, in accordance with the indications of said instrument.

5. In a system for the automatic steering of dirigible craft, the combination of an absolute direction indicator comprising an azimuth gyroscope and a compass each of which includes a member connected with the craft and a movable member, means for shifting the bearings of said gyroscope in accordance with the indications of said compass, means for manually shifting the position of the casing of said compass, a steering device, an operative connection between said movable members and said steering device, an instrument measuring the drift of the craft, and means whereby the said instrument will automatically shift relatively to the craft, those members of said gyroscope and said compass which are connected with the craft, in such a manner as to compensate for the drift.

6. In a system for the automatic steering of dirigible craft, the combination of an absolute direction indicator comprising an azimuth gyroscope and a compass each of which includes a member connected with the craft and a movable member, means for shifting the bearings of said gyroscope in accordance with the indications of said compass, a steering device, an operative connection between said movable members and said steering device, an instrument measuring the drift of the craft, and means whereby the said instrument will automatically shift relatively to the craft, those members of said gyroscope and said compass which are connected with the craft, in such a manner as to compensate for the drift.

7. In a system for the automatic steering of dirigible craft, the combination of an absolute direction indicator comprising an azimuth gyroscope and a compass each of which includes a member connected with the craft and a movable member, means for shifting the bearings of said gyroscope in accordance with the indications of said compass, means for manually shifting the position of the casing of said compass, a steering device, an operative connection between said movable members and said steering device, an instrument measuring the drift of the craft, and means whereby the said instrument will automatically shift relatively to the craft, that member of said gyroscope which is connected with the craft, in such a manner as to compensate for the drift.

8. In a system for the automatic steering of dirigible craft, the combination of a steering device, an absolute direction indicator including a member connected with the craft and a movable member, a connection by which said steering device is operated from said movable member, an instrument measuring the drift of the craft, and a connection by which the other member of said direction indicator is operated automatically from said instrument to shift said other member relatively to the craft in such a manner as to compensate for the drift.

9. In a system for the automatic steering of dirigible craft, the combination of a steering device, an instrument measuring the drift of the craft, and an indirect connection from said instrument to said steering device, said connection including an absolute direction indicator having two members, one of said members being movable and operatively connected with the steering device to control the latter, and the other member being connected with said instrument and controlled thereby to shift such other member relatively to the craft in such a manner as to compensate for the drift.

10. In a steering system for moving craft, a magnetic compass, a directional gyro, a radio direction responsive device, a rate of turn gyro, means for combining the effects of said compass, directional gyro, radio device and rate of turn gyro, and means responsive to said combined effects for steering the craft.

GERHARD RIEPER.